(12) United States Patent
Kostadinov et al.

(10) Patent No.: US 7,653,828 B2
(45) Date of Patent: Jan. 26, 2010

(54) TIMEOUT MANAGER

(75) Inventors: Dimitar P. Kostadinov, Sofia (BG);
Petio G. Petev, Sofia (BG); Hristo S. Iliev, Sofia (BG); Krasimir P. Semerdzhiev, Sofia (BG); Georgi N. Stanev, Sofia (BG); Jasen O. Minov, Sofia (BG)

(73) Assignee: SAP AG, Walldorf (DE)

( * ) Notice: Subject to any disclaimer, the term of this patent is extended or adjusted under 35 U.S.C. 154(b) by 898 days.

(21) Appl. No.: 10/856,135

(22) Filed: May 28, 2004

(65) Prior Publication Data

US 2005/0268136 A1    Dec. 1, 2005

(51) Int. Cl.
*G06F 1/12* (2006.01)
*G06F 1/14* (2006.01)

(52) U.S. Cl. ............. 713/400; 713/500; 713/502; 700/14; 700/19; 714/11; 714/12

(58) Field of Classification Search ........... 713/400, 713/500, 502; 700/14, 19; 714/11, 12
See application file for complete search history.

(56) References Cited

U.S. PATENT DOCUMENTS

| 5,917,868 | A | * | 6/1999 | Kuusinen | 375/354 |
| 5,946,498 | A | * | 8/1999 | Chiang et al. | 710/54 |
| 5,991,347 | A | * | 11/1999 | Kim et al. | 375/355 |
| 6,459,683 | B2 | * | 10/2002 | Busuioc et al. | 370/270 |
| 6,748,582 | B1 | * | 6/2004 | Chiles et al. | 717/111 |
| 6,760,634 | B2 | * | 7/2004 | Cook et al. | 700/82 |
| 6,826,706 | B2 | * | 11/2004 | Hanna | 713/502 |
| 6,990,646 | B2 | * | 1/2006 | Yoshikawa | 716/6 |
| 7,133,934 | B1 | * | 11/2006 | Rossello et al. | 709/249 |
| 2005/0114867 | A1 | * | 5/2005 | Xu et al. | 719/318 |
| 2005/0188273 | A1 | * | 8/2005 | Angelo et al. | 714/39 |

* cited by examiner

*Primary Examiner*—Thomas Lee
*Assistant Examiner*—Michael J Brown

(57) ABSTRACT

Embodiments include a timeout event management system that registers timeout events and checks for and corrects inaccuracies in timing caused by hibernation or system time changes. The timeout event management system may trigger an event after an intended delay time or at an intended expiration time. A handler program may be called in response to the triggered timeout. In an additional embodiment, the timeout system may track timeout events in a priority queue data structure.

24 Claims, 5 Drawing Sheets

US 7,653,828 B2

TIMEOUT MANAGER

BACKGROUND

1. Field of the Invention

The embodiments of the invention relate to event management. Specifically, embodiments of the invention relate to a mechanism to manage time event handling.

2. Background

A cluster system is utilized to provide a set of services and resources to a set of client computers. The cluster system includes a collection of server nodes and other components that are arranged to cooperatively perform computer-implemented tasks, such as providing client computers with access to the set of services and resources. A cluster system may be used in an enterprise software environment to handle a number of tasks in parallel. A cluster system is scalable and has the flexibility to enable additional cluster elements to be incorporated within or added to the existing cluster elements.

The cluster system is a client-server system that employs a multi-tiered architecture. In the multi-tiered system, presentation logic, business logic and a set of services and resources are logically separated from the user interface of the application. A client may execute a user interface. Other layers are separated from the client and operate on one or more dedicated servers on a network.

A multi-tiered architecture may be implemented using a variety of different application technologies at each of the layers of the multi-tier architecture, including those based on the Java 2 Enterprise Edition Specification created by Sun Microsystems, Santa Clara, Calif. ("J2EE"), the Microsoft .NET Framework created by Microsoft Corporation of Redmond, Wash. (".Net") and/or the Advanced Business Application Programming ("ABAP") standard developed by SAP AG. For example, in a J2EE environment, the business layer, which handles the core business logic of the application, is comprised of Enterprise Java Bean ("EJB") components with support for EJB containers. Within a J2EE environment, the presentation layer is responsible for generating servlets and Java Server Pages ("JSP") interpretable by different types of browsers at the user interface layer.

Applications and services deployed on an application server in the cluster system require a set of timeout services. These timeout services are utilized to set the timing of designated operations needed by a service or application. However, the timeout services in cluster systems function incorrectly if a machine hibernates or a system time is changed. In addition, timeout services are inefficiently managed, improperly synchronized and unable to wait for a timeout event handler to finish before rescheduling the event. The hibernation and system time inaccuracy causes timeout events to trigger when hibernation ends or the system time change is made ignoring the intended delay interval requested for the timeout event. Every time a timeout event is triggered any subsequent reoccurrence of the time out event is calculated based on the time stored before the hibernation or time change. Additionally, timeout events are typically stored in a linked list. This results in slow operation for a large number of timeout events and does not scale well.

SUMMARY

Embodiments include a timeout event management system that registers timeout events and checks for and corrects inaccuracies in timing caused by hibernation or system time changes. The timeout event management system may trigger an event after an intended delay time or at an intended expiration time. A handler program may be called in response to the triggered timeout. In an additional embodiment, the timeout system may track timeout events in a priority queue data structure.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
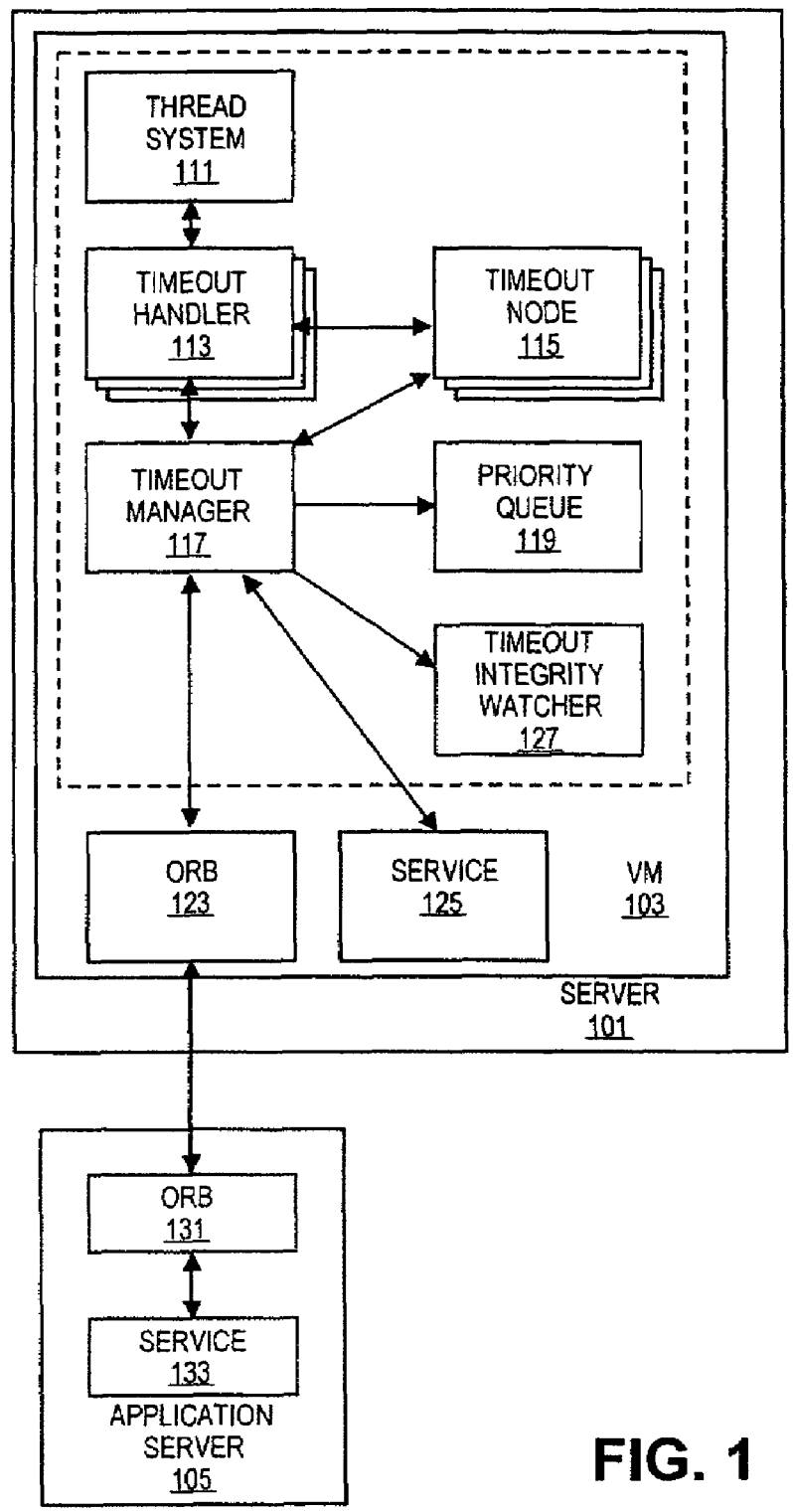
FIG. 1 is a block diagram of one embodiment of a timeout management system.

FIG. 1 is a diagram of one embodiment of a computer system running a timeout management system. In one embodiment, the timeout management system operates on a local machine to track a set of timeout events registered by applications, services and similar programs. Applications and services may be executed and stored on the local machine or on a remote machine in communication with the local machine. In one embodiment, the local machine running the timeout management system may be a dedicated server 101, an application server or the timeout management system may be distributed across multiple machines. In one embodiment, the software components comprising the timeout management system may be stored in a local file system, database or similar storage system. Applications, services and similar programs that register timeout events with the timeout management system may be referred to as timeout management system clients.

In one embodiment, the local machine may execute the timeout management system using a virtual machine 103 environment. Virtual machine 103 may be a java virtual machine including a java virtual machine based on the Java 2 Enterprise Edition Specification ("J2EE"), created by Sun MicroSystems, Santa Clara, Calif., or similar virtual machine. Virtual machine 103 may support any number of software components and programs. The timeout management system and similar programs and software components may be executed by the local machine in the form of objects or sets of objects. In one embodiment, the objects may be instantiated from a set of files, such as class files. The files may be a part of an archive file. In one embodiment, the archive files may be java archive files.

In one embodiment, the timeout management system may include a timeout manager module 117. The timeout manager module 117 may provide a set of methods, routines, operations or similar programs to allow the registration of timeout events and the handling of timeout events. Applications or services that may need to perform a function or operation at a defined time or in a defined recurring schedule may utilize timeout manager 117 to register a timeout event. Timeout manager module 117 may utilize a set of helper modules including a sequencing structure 119, an integrity watcher 127, and timeout nodes 115.

In one embodiment, a request to register a timeout event may originate from an application, service 125 or similar client. A 'client' for a timeout management system may be any application service or similar program that may seek to register a timeout event. Application, service 125 or similar client may be executed on server 101. The application, service 125, 133 or similar client may operate on a remote machine 105 or on the same machine 101 as the timeout management system. In one embodiment, the client requesting a registration of a timeout event may utilize an object request broker (ORB) 123, 131 or similar communications system to communicate data and parameters to timeout manager module 117. For example, protocols such as Remote Method Invocation (RMI), Internet Inter-ORB Protocol (IIOP), Common ORB Architecture (CORBA) and similar protocols may be supported. ORB 123, 131 may support communication between software components on different machines. In another embodiment, any protocol or communication service may be used that is capable of passing data and parameters between software components that may be remote from one another.

In one embodiment, the registration request for a timeout event may be passed to timeout manager 117. Timeout manager 117 may receive information related to a timeout handler module 113 as part of the registration request. Timeout handler 113 may be a routine, object or similar program for handling the requested timeout event. Each client requesting a registration of a timeout event may specify the timeout handler 113 to be called, instantiated or similarly executed when the timeout event occurs. In one embodiment, the timeout handler 113 may be located on the same machine as the timeout manager 117 or may be located or executed on another machine. For example, the timeout handler 113 may be located or executed on the machine of the client requesting the timeout event.

In one embodiment, timeout manager 117 may generate a timeout node 115 for each timeout request that may be received. Timeout node 115 may be used to correlate the timeout event with its timeout handler 113. Timeout node 115 invokes, calls, instantiates or similarly causes the correlated timeout handler 113 to run when the timeout event corresponding to timeout node 115 is triggered. In one embodiment, timeout node 115 may also be responsible for reregistering a timeout event if the timeout event is a recurring timeout event. When a timeout event is triggered, timeout node 115 may check to see if the timeout event is recurring and if so reregister the timeout event. In one embodiment, timeout manager may add each timeout node into a sequencing structure 119.

In one embodiment, the sequencing structure may be a priority queue or similar data structure. A priority queue may be a data structure that is scalable for handling large number of timeout event operations. Functions for a priority queue including storing, removing, and updating the priority queue may operate in logarithmic time. Sequencing structure 119 may order timeout nodes 115 based on their trigger times. These trigger times may be generated by timeout manager 117 and stored in timeout node 115 as a part of registration. Timeout manager 117 may then periodically check the next timeout node 115 to determine if its trigger time has been reached. For example, timeout manager 117 may check the head of a priority queue to determine if timeout node 115 at the head of the queue has reached its trigger time.

In one embodiment, when a timeout event occurs timeout manager 117 or timeout node 115 may initiate the generation of a new thread by utilizing thread system 111. The new thread may be assigned to timeout handler 113 for the timeout event that has been triggered. Thread system 111 is a system for sharing processor control between a set of 'threads' or 'threads of control.' Thread system 111 may be utilized to maximize the use of a processor by allowing multiple threads to run in multiple programs such that when one or more programs having a thread are idle, programs with threads that have work may continue to utilize the processor instead of waiting for the other programs to complete before utilizing the processor.

In one embodiment, timeout integrity watcher 127 works in conjunction with timeout manager 117 to ensure that the timeout events occur after their intended time delays. Timeout integrity watcher 127, checks the current time on a periodic basis. Timeout integrity watcher 127 monitors if there is any deviation in the system time during its periodic check. A deviation may be caused by a system time change, system hibernation or similar causes of time discrepancies. If a deviation is detected then all timeout nodes 115 are corrected to account for this detected deviation to ensure that the intended timeout delay is generated for each timeout event.

For example, a timeout event may be registered to be triggered after thirty seconds. A hibernation may occur after ten seconds and result in the machine being idle for ten minutes. When the system returns from hibernation, the integrity watcher 127 will correct the timeout node 105 so that the remaining twenty seconds of delay are taken instead of the timeout event being triggered immediately on return from hibernation.

In one embodiment, the time deviation may be detected by calculating delta times based on a regular check of the current time. If a threshold deviation is exceeded then timeout node 115 may be updated. For example, timeout integrity watcher 127 may check the current system time, an absolute value, each second, storing the result each time. The next time a check is made, the current system time is compared to the previous stored system time. If the times are exactly one second apart or approximately a second apart then no update to the timeout events may be needed. If the previous stored system time is more or less than one second difference from the current system time then a recalculation of the timeout events may be made to account for the deviation. In one embodiment, the deviation must exceed a threshold value before a recalculation is done. The deviation may be an accumulated value such that several deviations below the threshold value may accumulate into a deviation value that exceeds the threshold causing a recalculation.

In one embodiment, timeout manager 117 may provide an additional set of operations, methods or similar programs to be utilized by a client to interact with the timeout management system. In one embodiment, the timeout manager 117 may provide an unregistered operation or method to allow a client program to unregister a timeout event or timeout listener thereby removing it from the timeout management system. In one embodiment, timeout manager 117 provides a run operation, method or program that initiates the timeout management system. Timeout manager 117 may also provide a refreshing operation, method or program. The refreshing operation may force a check for system time deviation and a recalculation of timeout event timings, allow the change of a timeout handler 113 for a timeout event, force the update of attributes of the timeout events such as the delay of the timeout events or whether the timeout event should wait for completion, and facilitate similar changes to the handling of a timeout event.

In one embodiment, the timeout management system may support varying types of rescheduling for timeout events. One type of rescheduling may be an immediate rescheduling. An immediate rescheduling may reschedule the timeout event at the time it is triggered. The timeout event may be scheduled for the designated time period and with the designated handler. Another type of rescheduling may wait for completion of the prior timeout. The timeout management system may wait until the prior timeout event has been handled completely by its timeout handler and then schedule the next occurrence at the time of completion using the designated time delay and handler. Other variations of these scheduling schemes may be supported. In one embodiment, the timeout node may provide this functionality when its timeout event is triggered.

Figure 2:
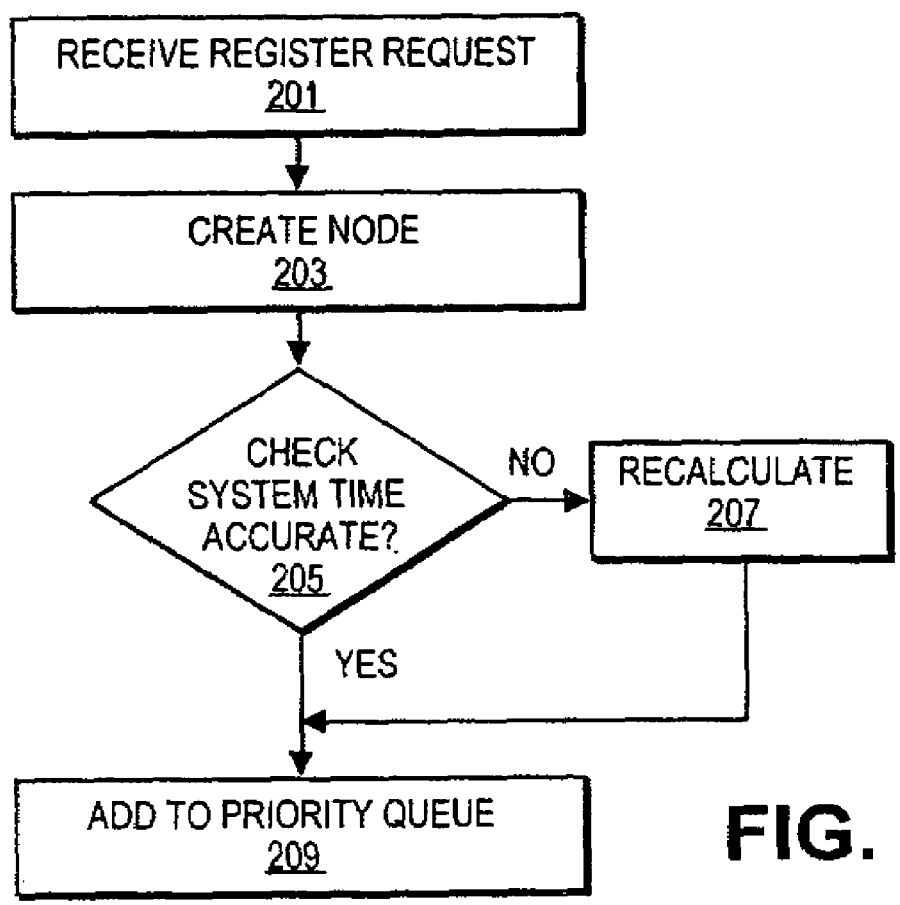
FIG. 2 is a flowchart of one embodiment of a process for registering timeout events.

FIG. 2 is a flowchart of one embodiment of a process for registering a timeout event in the timeout management system. In one embodiment, a client of the timeout management system may request that a timeout event be registered (block 201). A client may be a service, application or similar program. The request for registration may specify a timeout event handler program that may be called to handle a timeout event that is registered with the timeout event management system. The timeout event handler may be an object, routine or similar program. In one embodiment, the timeout event handler may be located local to the timeout management system or remote from the timeout management system. In one embodiment, where the timeout event handler is remote from the timeout management system, the request to register the timeout event may be received by the timeout manager through an ORB, remote procedure call, direct invocation or similar communication or argument passing system.

In one embodiment, a client seeking to register a timeout event may be required to obtain a lock for the timeout management system, an operation of the system or a component of the system. In one embodiment, a lock is an object, data structure, or similar program or data that can be utilized to control access to a resource to avoid multiple programs attempting to utilize the timeout system simultaneously and causing errors or discrepancies. Only a designated number of clients may hold a lock for the timeout management system at one time. In one embodiment, only one client may hold the lock and register a timeout at a given time. In another embodiment, similar mutual exclusion devices may be used to effect synchronization of the use of the timeout management system.

In one embodiment, in response to the registration request a timeout manager may create a timeout node to represent the timeout event to be tracked (block 203). In another embodiment, timeout events may be tracked using any type of data structure to maintain attributes and similar information about a set of timeout events. A timeout node may store attribute data about the timeout event and provide a set of methods, operations or similar programs to facilitate the handling of timeout events. For example, the timeout node may track whether the timeout event is a recurring timeout event, waits for completion of prior occurrences, has a designated timeout event handler and similar attributes and information. In one embodiment, the timeout node stores the timeout event expiration time or delay time. This expiration time or delay time may be supplied as an argument to the registration method, routine or similar program that may be a part of the timeout manager. Alternatively, the timeout event expiration time or delay may be calculated based on parameters supplied by the client, the registration program or method utilized by the client, by default or by similar method.

In one embodiment, the timeout manager or timeout node may make an initial check to determine the accuracy of the expiration or delay time for the timeout event (block 205). In one embodiment, the timeout manager or timeout node will utilize a timeout integrity watcher to check the accuracy of the expiration or delay time for the timeout events that have been registered. If the timeout integrity watcher determines that a time error has occurred, then the timeout expiration time or delay time may be recalculated for each registered timeout event and stored in the corresponding timeout node (block 207). A timeout event in the process of being registered will utilize current system timing to calculate timeout expiration and store it in its timeout node.

In one embodiment, the recalculation and time check functions may be methods, routines or similar programs provided by the timeout integrity watcher. If no time error is detected by the timeout integrity watcher or the timeout integrity watcher has completed a recalculation of the timeout event timing then the timeout node may be added to the sequencing structure (block 209).

In one embodiment, the sequencing structure may be a priority queue where timeout nodes are ordered based on their timeout event expiration or delay times or a similar data structure or ordering may be utilized. In one embodiment, if the timeout event being added to the sequencing structure is the next timeout event to expire or occur, then an immediate check for a timeout event triggering may be initiated or a notification to the timeout manager to initiate a check of the sequencing structure may be generated. For example, if a timeout node is added to the head of priority queue structure, then an immediate check may be requested. The immediate check may be used to prevent a new timeout event from being triggered past its intended delay due to the timeout manager anticipating a delay based on another timeout event.

Figure 3:
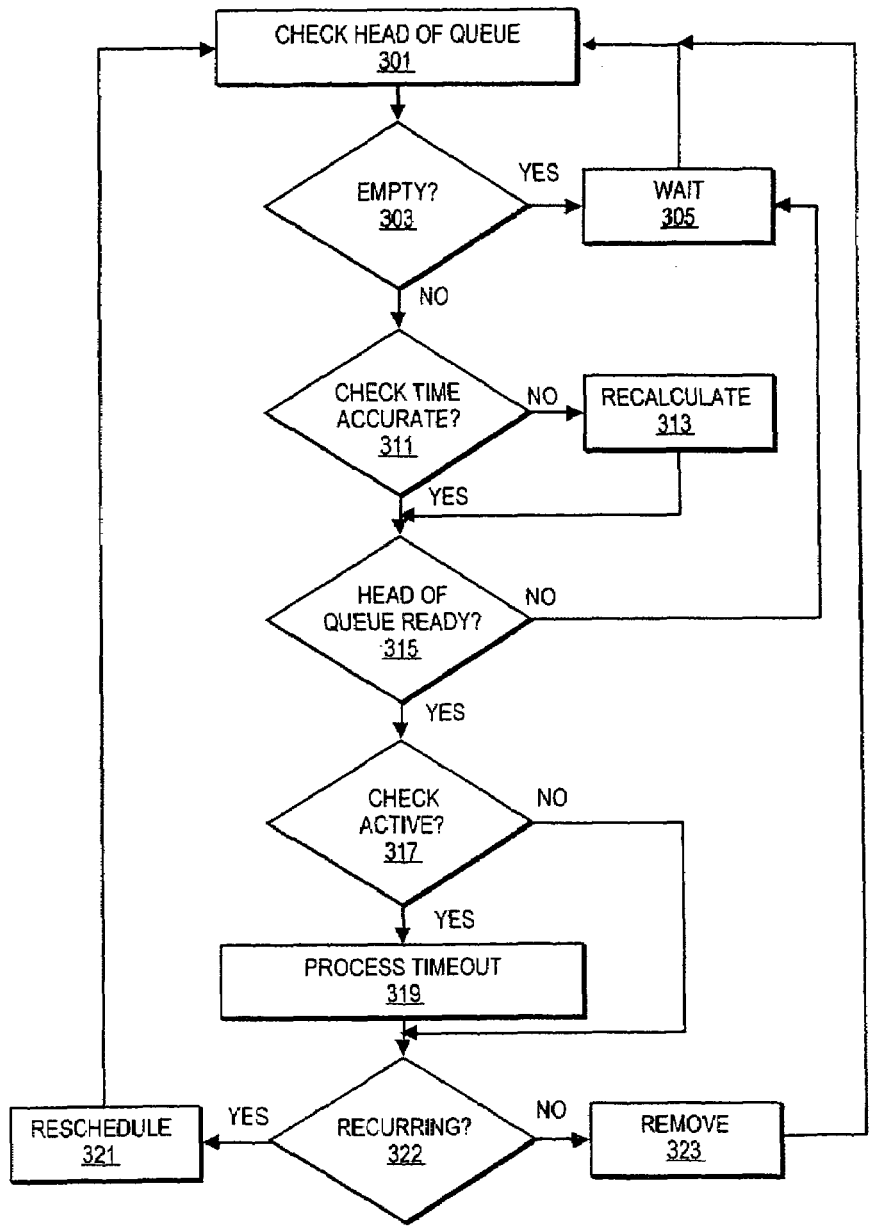
FIG. 3 is a flowchart of one embodiment of a process for managing timeout events.

FIG. 3 is a flowchart of one embodiment of a process for triggering timeout events and processing timeout events. In one embodiment, the timeout manager may be initiated to run and manage the triggering of timeout events that have been registered with the timeout management system. In one embodiment, the timeout manager periodically or continually checks a sequencing structure that stores the timeout events to determine which timeout event is next to be processed (block 301). In one embodiment, the sequencing structure is a priority queue or similar data structure. The priority queue may sort timeout events or nodes so that the next timeout event or associated node is always placed at the head of the queue or equivalent position. The timeout manager may check the node at the head of the queue or equivalent position to determine if the timeout event is to be triggered.

In one embodiment, the first check on the sequencing structure may be to determine if the sequencing structure is empty (block 303). A sequencing structure such as a priority queue or similar structure may be associated with a set of methods, routines or similar programs to utilize the sequencing structure. A method, routine or similar program to determine whether the sequencing structure is empty may be provided. If the sequencing structure is empty then the timeout manager may wait for a predetermined time before checking the structure again to determine if a timeout event or node is present that may need to be serviced (block 305). After the wait, the process may be restarted. If the sequencing structure is not empty then the timeout manager may utilize the timeout integrity watcher to determine if the timings of the timeout events or timeout nodes in the sequencing structure need to be recalculated to correct discrepancies caused by system events like hibernation or system time changes (block 311). If a discrepancy is detected the timeout manager may initiate the recalculation of all nodes or timeout events stored or tracked in the sequencing structure (block 313). If no time discrepancies are detected or the recalculation has been completed then the timeout manager may check if the time for the next timeout event has occurred (block 315). In one embodiment, if the time for the next timeout event has not been reached then the timeout manager may wait for a predetermined time before checking the sequencing structure again (block 305). In another embodiment, the timeout manager may wait for a time period based on the remaining time for the next timeout event.

In one embodiment, a timeout event or node stored or tracked in the sequencing structure may be inactive. The timeout manager may check to determine if a timeout event or node that is ready to be triggered is active (block 317). A client or similar program that registered a timeout event may inactivate the timeout without removing or unregistering the timeout event. In one embodiment, the timeout event may be inactivated by setting conditions, variables, or similar state data in a corresponding timeout listener such that the timeout listener returns 'false' when a check method or similar programs provided by the timeout listener is called to determine the status of a timeout event. For example, a client may temporarily inactivate a timeout event in the anticipation that it may be reactivated to avoid having to reregister the timeout event.

In one embodiment, an inactive timeout event may not be processed. A check may be made if the inactive timeout event is recurring (block 322). If the inactive timeout event is recurring then it may be rescheduled (block 321). If the inactive timeout event is not recurring, then the timeout event may be removed from the sequencing structure (block 323). In one embodiment, only timeout events that do not have any further occurrence may be removed. Timeout events with further occurrence may be removed by unregistering the timeout events. In one embodiment, a timeout event may track a number of future occurrences and may be rescheduled so long as the number of future occurrences is greater than zero. In another embodiment, the timeout manager may wait for a predetermined time or a time based on the next timeout event or node in the sequencing structure before checking for the next event or node. In one embodiment, the process resumes by checking the sequencing structure for the next timeout event (block 301).

In one embodiment, if the timeout event or node is active then the timeout manager may initiate the processing of the timeout event (block 319). The processing may be initiated by requesting the generation of a new thread by the timeout manager or timeout node. This new thread may be used by the associated timeout event handler that is associated with the timeout event that has been triggered. The timeout event handler may then execute independent of the timeout manager and timeout node with its own thread of control. In one embodiment, the timeout node or timeout manager may check to determine if the timeout event is a recurring timeout event (block 322). If the timeout event is not a recurring event then the timeout node or event may be removed from the sequencing structure (block 323) and the timeout manager may check for the next timeout (block 301).

In one embodiment, if the timeout event is a recurring event, then the timeout manager or timeout node may reschedule the timeout event or node by updating the time delay or expiration time and replacing the event or node in the sequencing structure (block 321). In one embodiment, the calculation of the expiration time or delay for the rescheduled timeout event or node may be based on the prior expiration or delay time. Alternatively, the rescheduled timeout event or node may be based on the time the processing of the prior occurrence completed. A client may specify this attribute of a timeout event and a timeout node may store this attribute information.

Figure 4:
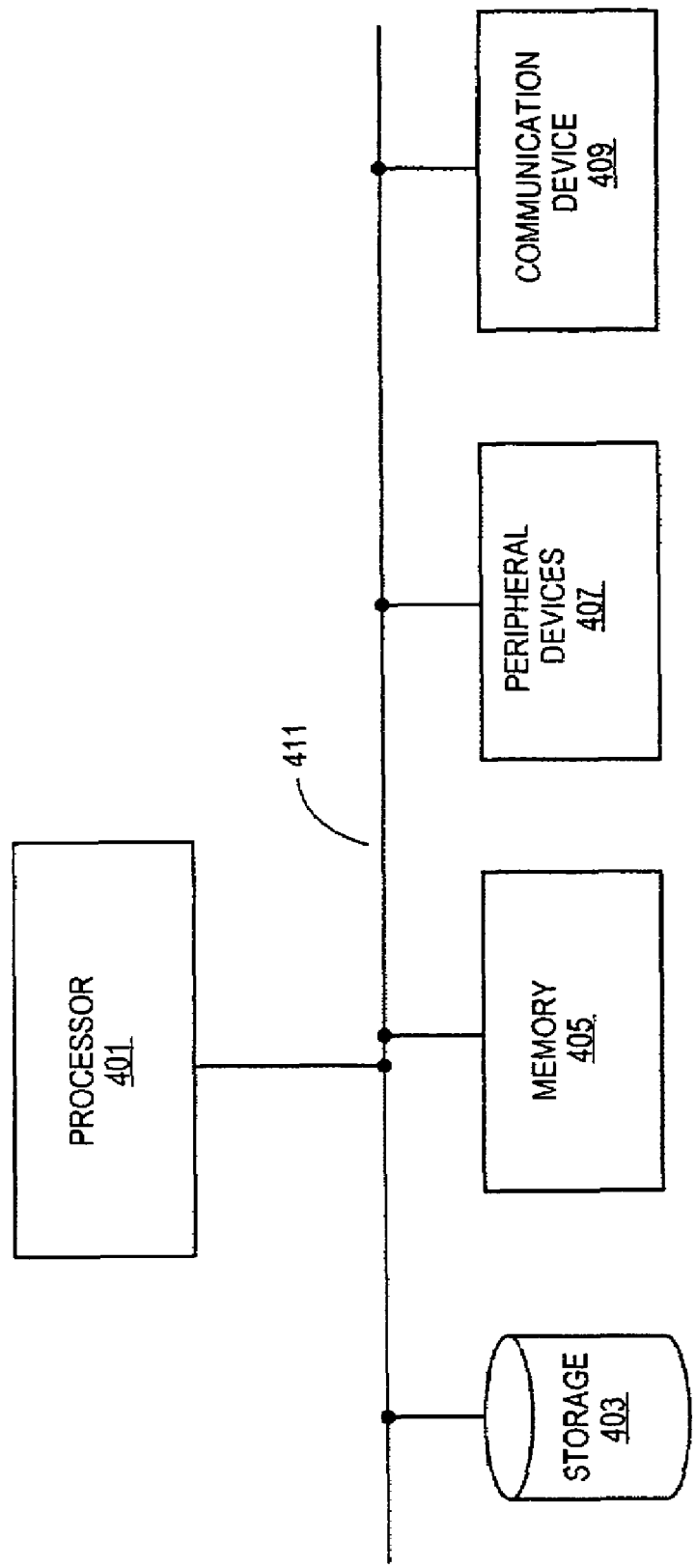
FIG. 4 is a diagram of one embodiment of a computer system running the timeout management system.

FIG. 4 is a block diagram of an exemplary computer system for executing the timeout management system. In one embodiment, the computer system may include a processor 401 or set of processors to execute the timeout management system modules, virtual machine, applications, services and similar programs. The processor may be a general-purpose processor, application specific integrated circuit (ASIC) or similar processor. Processor 401 may be in communication via a bus 411 or similar communication medium with a memory device 405. Memory device 405 may be a system memory device or set of devices such as double data rate (DDR) memory modules, synchronized dynamic random access memory (SDRAM) memory modules, flash memory modules, or similar memory devices. Memory device 405 may be utilized by processor 401 as a working memory to execute the virtual machine, applications, the offline deployment system and similar programs.

In one embodiment, the computer system may include a storage device 403. Storage device 403 may be a magnetic disk, optical storage medium, flash memory, or similar storage device. Storage device 403 may be utilized to store files, including a file system, program files, including timeout management system files, temporary files, index files and similar files and data structures. The computer system may also include a set of peripheral devices 407. Peripheral devices 407 may include input devices, sound system devices, graphics devices, display devices, auxiliary storage devices, or similar devices or systems utilized with a computer system.

In one embodiment, the computer system may include a communication device 409. Communication device 409 may be a networking device to allow the computer system and applications, services and similar programs to communicate with other computers, applications, services and similar programs. In one embodiment, communication device 409 may be utilized to communicate with a remote application server executing a client application that may request timeout management services.

Figure 5:
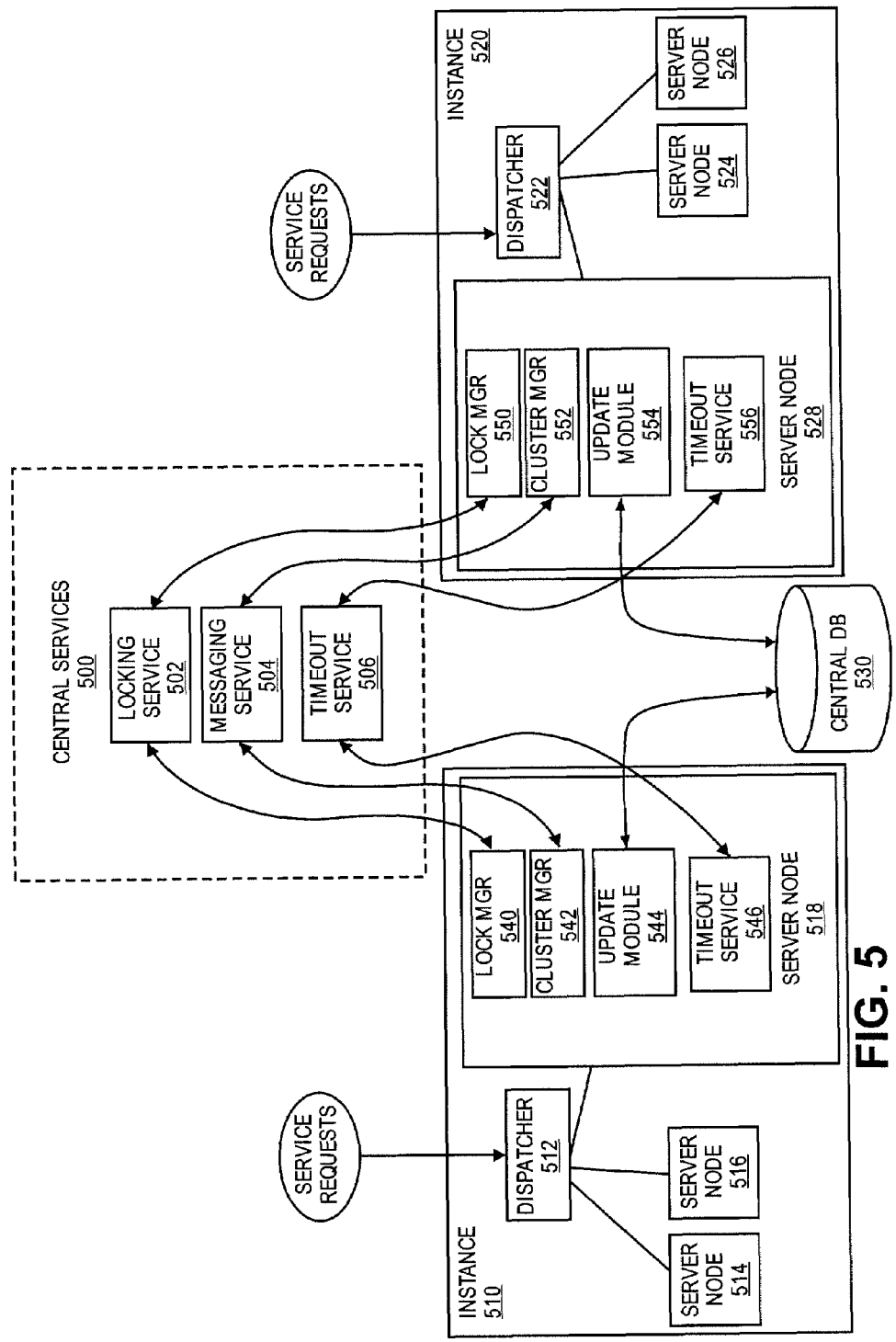
FIG. 5 is a diagram of one embodiment of a cluster system running the timeout management system.

FIG. 5 is one embodiment of a cluster system that includes a timeout management system. In one embodiment, the computer system architecture may include a central services instance 500 and a plurality of application server instances 510, 520. The application server instances, 510 and 520, may each include a group of application servers 514, 516, 518 and 524, 526, 528, respectively, and a dispatcher, 512, 522, respectively. The central services instance 500 may include a locking service 502 and a messaging service 504. In one embodiment, the application servers are organized into groups referred to as "instances." Each instance includes a group of redundant application servers and a dispatcher for distributing service requests to each of the application servers. A group of instances may be organized as a "cluster." The combination of the application server instances 510, 520 and the central services instance 500 may be the primary constituents of the cluster system. Although the following description will focus primarily on instance 510 for the purpose of explanation, the same principles and concepts apply to other instances such as instance 520.

In one embodiment, the application servers 514, 516, 518 within instance 510 may provide business and/or presentation logic for the network applications supported by the cluster system. Each of application servers 514, 516 and 518 within a particular instance 510 may be configured with a redundant set of application logic and associated data. In one embodiment, dispatcher 512 distributes service requests from clients to one or more of application servers 514, 516 and 518 based on the load on each of the servers. For example, in one embodiment, dispatcher 512 may implement a round-robin policy of distributing service requests. The term "load-balancing mechanism" refers to the logic implemented by dispatcher 512 to distribute service requests to application servers 514, 516 and 518.

In one embodiment, application servers 514, 516 and 518 may be Java 2 Enterprise Edition ("J2EE") application servers which support Enterprise Java Bean ("EJB") components and EJB containers (at the business layer) and Servlets and Java Server Pages ("JSP") (at the presentation layer). In another embodiment, the cluster system, applications servers and update module may be implemented in the context of various other software platforms including, by way of example, Microsoft .NET platforms and/or the Advanced Business Application Programming ("ABAP") platforms developed by SAP AG. Central services 500 and the locking service 502, messaging service 504 and timeout service 506 may be implemented utilizing J2EE, EJB, JSP, .NET, ABAP or similar platforms and components.

In one embodiment, communication and synchronization between each of the instances 510, 520 may be enabled via central services instance 500. Central services instance 500 may include a messaging service 504 and a locking service 502. Message service 504 allows each of the servers within each of the instances to communicate with one another via a message passing protocol. For example, messages from one server may be broadcast to all other servers within the cluster system via messaging service 504. Alternatively, messages may be addressed directly to specific servers within the cluster (e.g., rather than being broadcasted to all servers). In one embodiment, central service 500 may include a locking service 502 to control access to resources and programs in the cluster system, such as certain specified portions of program code stored within a central database 530. The locking manager may lock data on behalf of various system components which need to synchronize access to specific types of data and program code.

In one embodiment, messaging service 504, locking service 502, and timeout service 506 may each be implemented on dedicated servers. In an alternative embodiment, however, messaging service 504, locking service 502 and timeout service 506 may be implemented on a single server. In yet another alternative embodiment, messaging service 504, locking service 502 and timeout service 506 may be distributed across multiple servers.

In one embodiment, each application server may include a lock manager 540, 550 for communicating with locking service 502; and a cluster manager 542, 552 for communicating with messaging service 504. Although the lock manager 540, 550, and cluster manager 542, 552 are illustrated only with respect to application servers 518 and 528 in FIG. 5, each of the application servers 514, 516, 524 and 526 and/or on dispatchers 512, 522 may be equipped with equivalent lock managers and messaging managers.

In one embodiment, applications servers 518, 528 may include update modules 544, 554. Update modules 544, 554 may communicate with database 530 to update each application server in accordance with a configuration of services, applications and files deployed in database 530. In one embodiment, database 530 may contain files and data to be deployed to an array of different platforms. Updating an application server in accordance with a deployment on database 530 may include removing or undeploying files from the application server that are no longer a part of the deployment present on database 530. Each application server may have an update module in communication with database 530.

In one embodiment, application servers 518, 528 may include timeout service modules 546, 556. Timeout service modules 546, 556 may provide the functionality of a timeout management system to each application server in the cluster system. Applications, services and similar programs may send registration requests to timeout services 546, 556 on the same application server. In one embodiment, an application server may have multiple instances of timeout services modules 546, 556. In another embodiment, the timeout services may be remote from a registering application, service or program. For example, the timeout services may be part of central services 500.

In one embodiment, the timeout management system may be implemented in software and stored or transmitted in a machine-readable medium. As used herein, a machine-readable medium is a medium that can store or transmit data such as a fixed disk, physical disk, optical disk, CDROM, DVD, floppy disk, magnetic disk, wireless device, infrared device, and similar storage and transmission technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a timeout event manager module to register one or more timeout events upon receiving a request from a computer program to execute a corresponding function or service after one or more predefined time delays, the timeout event manager module to trigger a timeout event of the registered one or more timeout events according to a system time flow;
a timeout event handler module to process the execution of the corresponding function or service when the timeout event is triggered;
a memory comprising a sequencing structure to store, remove, update and order the registered one or more timeout events to be triggered, wherein the order is based upon expected trigger times of the registered one or more timeout events;
a timeout event module associated with a recurring timeout event of the registered one or more timeout events to schedule a second occurrence of the event with a respective trigger time; and
a time integrity watcher module to detect a discrepancy in system time flow and to correct the registered one or more timeout events in order to ensure the order and the predefined one or more time delays.

2. The apparatus of claim 1, further comprising:
a timeout event node to invoke a timeout event handler module.

3. The apparatus of claim 1, further comprising:
the timeout event handler module to process a timeout event from the registered one or more timeout events before a predefined expiration time.

4. The apparatus of claim 1, wherein the sequencing structure comprises:
a priority queue to store timeout events.

5. The apparatus of claim 1, further comprising:
the timeout event module to schedule a second occurrence of the recurring timeout event before a predefined expiration time.

6. A method comprising:
tracking an order of a set of registered timeout events to be triggered;
determining if a system time flow has been affected by a time discrepancy;
correcting the time discrepancy;
triggering a timeout event of the set of registered timeout events according to the system time flow, wherein triggering the timeout event invokes a timeout event handler to execute a corresponding function or service; and rescheduling a recurring timeout event of the set of registered timeout events to occur after the timeout event handler has completed a processing of a prior occurrence of the recurring timeout event.

7. The method of claim 6, further comprising:

storing a timeout event in a priority queue.

8. The method of claim 6, further comprising:

synchronizing the registration of a timeout event.

9. The method of claim 6, further comprising:

correcting a timeout event for one of a system hibernation and system time change which resulted in the time discrepancy.

10. A system comprising:

a processor to execute a timeout event manager to manage an order of a set of registered timeout events and a timeout integrity watcher to detect and correct timeout event timings based on system events affecting a system time flow, the timeout event manager to register one or more timeout events upon receiving a request from a computer pro gram to execute a corresponding function or service after one or more predefined timeout event timings and a memory device in communication with the processor to store a data structure to track the order of the set of registered timeout events.

11. The system of claim 10, further comprising:

a system clock to provide a current time indicator.

12. The system of claim 10, further comprising:

a timeout event handler executed by the processor to handle a timeout event invoked by the timeout event manager.

13. A system comprising:

a plurality of servers to provide a service to a client, the service to register one or more timeout events with a timeout event manager upon receiving a request from a computer program to execute a corresponding function or service after one or more time delays, the timeout event manager to trigger a timeout event of the registered one or more timeout events according to a system time flow and to invoke a timeout event handler to execute the corresponding function or service, the plurality of servers providing a time integrity watcher to detect a system time error and to adjust the registered one or more timeout events accordingly;

a centralized database in communication with the plurality of servers to provide data to the plurality of servers;

a dispatcher to distribute a load for the plurality of servers from a set of service requests; and a central services provider including the timeout event manager to schedule a recurring timeout event of the registered one or more timeout events to occur a predetermined time after the completed handling of a prior occurrence of the recurring time event.

14. The system of claim 13, further comprising:

a timeout event sequencing structure to track the order of a set of timeout events.

15. The system of claim 13, further comprising:

a system clock that may be checked to detect a time error caused by one of a reset system clock and a hibernation period.

16. An apparatus comprising:

means for tracking an order of a set of registered timeout events to be triggered;

means for determining if system timing is inaccurate;

means for correcting the system timing;

means for triggering a timeout event of the registered one or more timeout events according to the system timing, wherein triggering the timeout event invokes a timeout event handler to execute a corresponding function or service; and means for rescheduling a recurring timeout event of the set of registered timeout events to occur after the timeout event handler has completed a processing of a prior occurrence of the recurring timeout event.

17. The apparatus of claim 16, further comprising:

means for storing a timeout event in a priority queue.

18. The apparatus of claim 16, further comprising:

means for correcting timeout events if system timing is inaccurate.

19. The apparatus of claim 16, further comprising:

means for rescheduling a recurring timeout event after the timeout event handler has completed processing a prior recurring timeout event.

20. A machine readable medium having instructions stored therein which when executed cause a machine to perform a set of operations comprising:

tracking an order of a set of registered timeout events to be triggered;

determining if a time designator for the registered timeout events has been affected by a time discrepancy;

correcting the time discrepancy;

triggering a timeout event from the set of registered timeout events according to the time designator, wherein triggering the timeout event invokes a timeout event handler to execute a corresponding function or service; and rescheduling a recurring timeout event from the set of registered timeout events to occur after the timeout event handler has completed the processing of a prior occurrence of the recurring timeout event.

21. The machine readable medium of claim 20, having further instructions stored therein which when executed cause a machine to perform a set of operations further comprising:

storing the timeout event in a priority queue.

22. The machine readable medium of claim 20, having further instructions stored therein which when executed cause a machine to perform a set of operations further comprising:

synchronizing the registration of a timeout event.

23. The machine readable medium of claim 20, having further instructions stored therein which when executed cause a machine to perform a set of operations further comprising:

checking a system clock for the time discrepancy resulting from one of a system hibernation and system time change.

24. The machine readable medium of claim 20, having further instructions stored therein which when executed cause a machine to perform a set of operations further comprising:

correcting the timeout event for the time discrepancy.

* * * * *

UNITED STATES PATENT AND TRADEMARK OFFICE
CERTIFICATE OF CORRECTION

PATENT NO. : 7,653,828 B2 Page 1 of 1
APPLICATION NO. : 10/856135
DATED : January 26, 2010
INVENTOR(S) : Kostadinov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Twenty-eighth Day of December, 2010

David J. Kappos
*Director of the United States Patent and Trademark Office*